United States Patent
Baahmed et al.

(10) Patent No.: US 12,208,662 B2
(45) Date of Patent: Jan. 28, 2025

(54) HOUSING FOR A HEATING, AIR-CONDITIONING AND/OR VENTILATION DEVICE FOR A MOTOR VEHICLE

(71) Applicant: Valeo Systemes Thermiques, Le Mesnil Saint-Denis (FR)

(72) Inventors: Saïd Baahmed, Le Mesnil Saint-Denis (FR); Julien Brault, Le Mesnil Saint-Denis (FR); Hervé Rignault, Le Mesnil Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 581 days.

(21) Appl. No.: 17/433,436

(22) PCT Filed: Feb. 10, 2020

(86) PCT No.: PCT/FR2020/050237
§ 371 (c)(1),
(2) Date: Aug. 24, 2021

(87) PCT Pub. No.: WO2020/174147
PCT Pub. Date: Sep. 3, 2020

(65) Prior Publication Data
US 2022/0161636 A1    May 26, 2022

(30) Foreign Application Priority Data
Feb. 25, 2019 (FR) ...................... 1901900

(51) Int. Cl.
*B60H 3/06* (2006.01)
*B60H 1/00* (2006.01)

(52) U.S. Cl.
CPC ....... *B60H 3/0616* (2013.01); *B60H 1/00521* (2013.01); *B60H 2003/065* (2013.01)

(58) Field of Classification Search
CPC combination set(s) only.
See application file for complete search history.

(56) References Cited

U.S. PATENT DOCUMENTS 5,119,718 A * 6/1992 Wagner .............. B60H 1/00378
55/433
5,472,379 A * 12/1995 Andress ............... B60H 3/0658
55/502

(Continued)

FOREIGN PATENT DOCUMENTS

CN 107187297 A 9/2017
DE 4205836 C1 * 7/1993 ......... B01D 46/0005

(Continued)

OTHER PUBLICATIONS

International Search Report with Written Opinion in corresponding International Application No. PCT/FR2020/050237, mailed May 13, 2020 (11 pages).

(Continued)

*Primary Examiner* — Christopher P Jones
*Assistant Examiner* — Sonji Turner
(74) *Attorney, Agent, or Firm* — Osha Bergman Watanabe & Burton LLP (57) ABSTRACT

The present invention relates to a housing (1) for a heating, air-conditioning and/or ventilation device for a motor vehicle, configured to receive an air filter (3), said air filter (3) comprising a first filtering medium (30) which is delimited by at least two primary frame strips (300) and a second filtering medium (31) which is delimited by at least two secondary frame strips (310), according to which said housing (1) comprises at least one maintenance device (100) which is configured to retain one of said primary frame strips (300) when said first filtering medium (10) is mounted in said housing (1).

12 Claims, 8 Drawing Sheets

(56) References Cited

U.S. PATENT DOCUMENTS

| | | | | | |
|---|---|---|---|---|---|
| 5,554,205 | A | * | 9/1996 | Ernst | B01D 46/521 55/497 |
| 5,603,476 | A | * | 2/1997 | Merk | B60H 3/0608 55/497 |
| 5,860,856 | A | * | 1/1999 | Teich | B60H 3/0616 454/158 |
| 7,833,300 | B2 | * | 11/2010 | Taniuchi | E02F 9/0866 55/480 |
| 10,259,293 | B2 | * | 4/2019 | Schumacher | B01D 46/0006 |
| 10,391,841 | B2 | * | 8/2019 | Nefzer | B01D 46/10 |

FOREIGN PATENT DOCUMENTS

| | | | | |
|---|---|---|---|---|
| DE | 19647043 C1 | * | 6/1998 | ......... B01D 46/0002 |
| DE | 10356809 B3 | | 12/2005 | |
| DE | 102005048841 B3 | * | 7/2007 | ......... B01D 46/0005 |
| DE | 102010053758 A1 | * | 6/2012 | ........... B01D 46/009 |
| DE | 102017001923 A1 | | 9/2018 | |
| EP | 2514617 A2 | | 10/2012 | |
| FR | 2852529 A1 | * | 9/2004 | ......... B01D 46/0005 |
| FR | 2901184 A1 | | 11/2007 | |
| JP | S6179618 U | | 5/1986 | |
| JP | H0143137 Y2 | * | 12/1989 | ............. B01D 46/10 |
| JP | 2010-000855 A | | 1/2010 | |

OTHER PUBLICATIONS

Office Action issued in counterpart Chinese Patent Application No. CN 202080016347.9 mailed Nov. 22, 2023 (38 pages).

* cited by examiner

HOUSING FOR A HEATING, AIR-CONDITIONING AND/OR VENTILATION DEVICE FOR A MOTOR VEHICLE

The present invention relates to a housing for a heating, air-conditioning and/or ventilation device for a motor vehicle, configured to receive an air filter, it is particularly applicable, but not limited, to motor vehicles.

A housing for a heating, air-conditioning and/or ventilation device for a motor vehicle is known to a person skilled in the art, that allows the removal and replacement of an air filter through an opening provided in the heating, air-conditioning and/or ventilation device. The air filter comprises a first filtering medium and a second filtering medium.

One drawback of this prior art is that on after-sales replacement of the air filter, the first filtering medium, which is inserted into the opening first, is not held in position, which complicates the installation of the second filtering medium. The first filtering medium must be held manually while inserting the second filtering medium. The after-sales fitting of the air filter is therefore difficult for an operator to perform.

In this context, the present invention aims to propose a housing for a heating, air-conditioning and/or ventilation device for a motor vehicle configured to retain an air filter that makes it possible to overcome the aforementioned drawback.

To this end, the invention proposes a housing for a heating, air-conditioning and/or ventilation device for a motor vehicle, configured to receive an air filter, said air filter comprising a first filtering medium delimited by at least two primary frame strips and a second filtering medium delimited by at least two secondary frame strips, according to which said housing comprises at least one retaining device configured to retain one of said primary frame strips when said first filtering medium is fitted in said housing.

As will be seen in detail below, said at least one retaining device frees an operator fitting the air filter from manually holding the first filtering medium when they are inserting the second filtering medium into the opening provided to this end. Said at least one retaining device thus makes it possible to retain the first filtering medium when it is fitted in the housing.

According to non-limiting embodiments, the housing can further include one or more of the following additional features taken alone or in any technically possible combination.

According to one non-limiting embodiment, said housing comprises two retaining devices.

According to one non-limiting embodiment, said retaining device is a stop.

According to one non-limiting embodiment, said stop has a cross-section that is:
a. hemispherical, or
b. triangular.

According to one non-limiting embodiment, said at least one retaining device comprises a head extended by a spring.

According to one non-limiting embodiment, said housing comprises:
a. a cavity configured to receive said spring, or
b. a movable external tab connected to said spring.

According to one non-limiting embodiment, said primary frame strip retained by said retaining device is deformable.

According to one non-limiting embodiment, said first filtering medium is delimited by four primary frame strips and said second filtering medium is delimited by four secondary frame strips.

According to one non-limiting embodiment, one of the primary frame strips and/or one of the secondary frame strips comprises a folding tab.

According to one non-limiting embodiment, said housing forms part of said heating, air-conditioning and/or ventilation device or is attached thereto.

The invention also proposes an air filter configured to be received in a housing for a heating. air-conditioning and/or ventilation device for a motor vehicle, said air filter comprising a first filtering medium delimited by at least two primary frame strips and a second filtering medium delimited by at least two secondary frame strips, according to which one of the primary frame strips is deformable and is configured to be retained by a retaining device of said housing.

The invention also proposes a heating, air-conditioning and/or ventilation device for a motor vehicle comprising a housing configured to receive an air filter according to any one of the preceding features.

The invention also relates to a motor vehicle comprising such a heating, air-conditioning and/or ventilation device.

The invention and its various applications will be better understood upon reading the following description and with reference to the accompanying figures, in which.

Elements that are identical, in structure or in function, and that appear in several figures use the same reference signs, unless otherwise specified.

The housing 1 for a heating, air-conditioning and/or ventilation device 2 for a motor vehicle is described with reference to FIGS. 1 to 11. The term motor vehicle is given to mean any type of motorized vehicle. The heating, air-conditioning and/or ventilation device is known by the acronym HVAC ("Heating Ventilation and Air-Conditioning") and is otherwise referred to as the HVAC device hereinafter. The housing 1 is configured to receive an air filter 3.

In one non-limiting embodiment, the air filter 3 is suitable for:
 a. dehumidifying the air in the passenger compartment of the motor vehicle, and
 b. filtering an air stream F at the inlet of the HVAC device.

The motor vehicle comprises an air inlet (not illustrated) through which an air stream F (illustrated in FIG. 1) can enter and flow towards the HVAC device in the non-limiting embodiment taken. Said HVAC device is thus suitable for receiving the air stream F at its inlet, and said housing 1 with said air filter 3 is positioned upstream of the other elements of said HVAC device so as to treat said air stream F.

Figure 2:
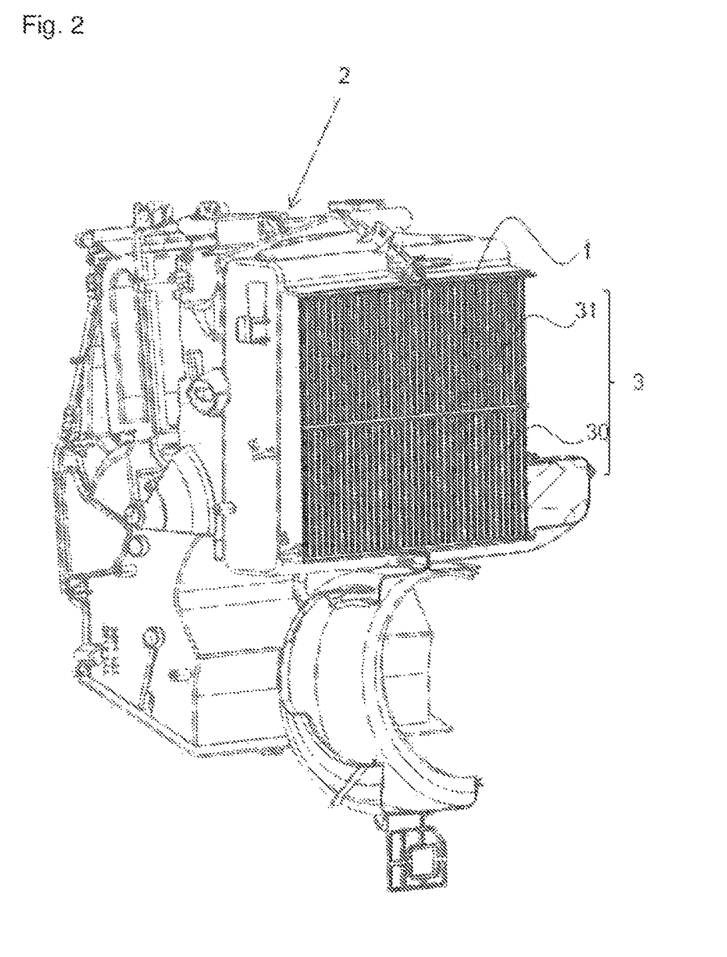
FIG. 2 illustrates a partial cross-sectional view of said housing and said air filter in FIG. 1, according to a non-limiting embodiment.
Figure 10:
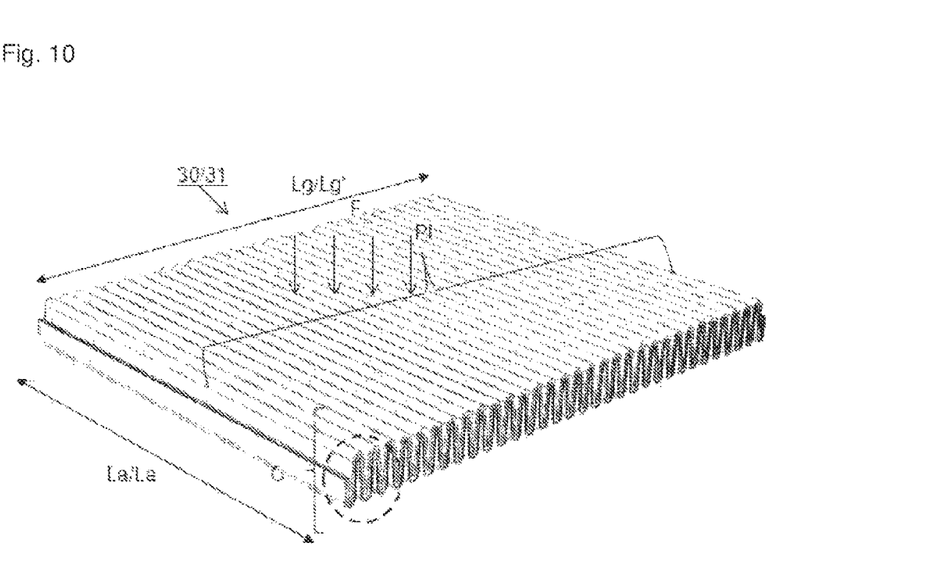
FIG. 10 illustrates the first filtering medium or the second filtering medium of the air filter in FIG. 1, according to a non-limiting embodiment.

As illustrated in FIG. 2, the air filter 3 comprises a first filtering medium 30 and a second filtering medium 31. FIG. 10 illustrates the first filtering medium 30 or the second filtering medium 31. The first filtering medium 30 and the second filtering medium 31 comprise a plurality of filtering layers C. In a non-limiting embodiment illustrated, the filtering layers C are folded and form folds PI. The first filtering medium 30 and the second filtering medium 31 have a respective length Lg, Lg' and a respective width La, La'. In one non-limiting embodiment, the lengths Lg, Lg' are equal and the widths La, La' are equal.

Figure 11:
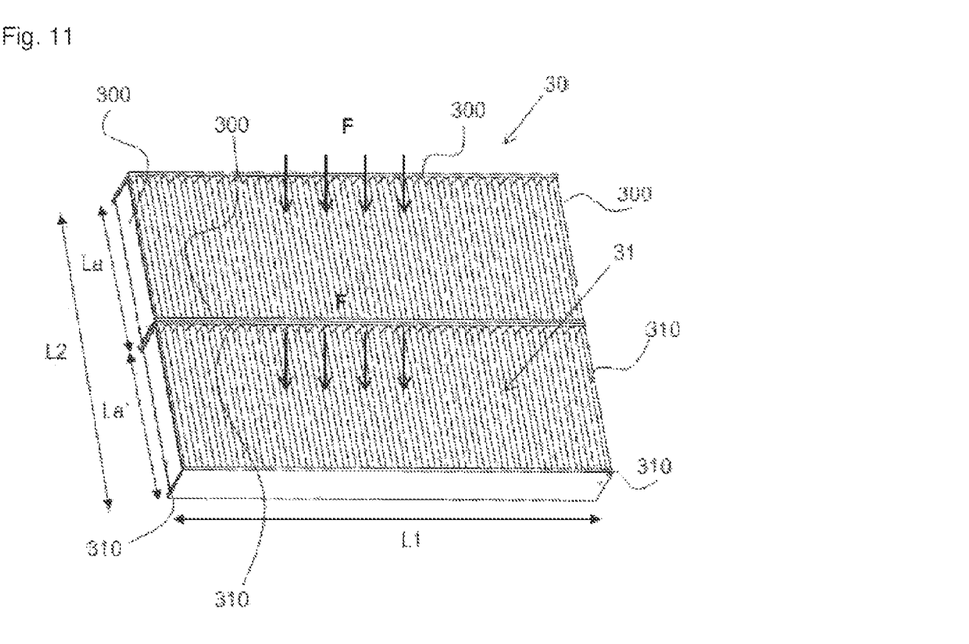
FIG. 11 illustrates the first filtering medium and the second filtering medium of the air filter in FIG. 1, delimited by frame strips, according to a non-limiting embodiment.

The first filtering medium 30 and the second filtering medium 31 are respectively delimited by at least two primary frame strips 300 and at least two secondary frame strips 310. The two filtering mediums 300 and 310 are separate from each other. In other words, the filtering medium comprises a primary filtering medium and a secondary filtering medium. In a non-limiting embodiment illustrated in FIG. 11, each filtering medium is delimited by four frame strips. Four primary frame strips 300 and four secondary frame strips 310 are thus bonded respectively to the four edges of the first filtering medium 30 and the four edges of the second filtering medium 31. It will be noted that the four primary frame strips 300 or the four secondary frame strips 310 can be connected to each other, particularly when the four edges of the filtering medium 1 are framed. A primary frame strip 300 and a secondary frame strip 310 are in contact with each other over their entire length and thus define the boundary between the first filtering medium 30 and the second filtering medium 31. The primary frame strips 300 and the secondary frame strips 310 respectively make it possible to frame the plurality of layers C of the first filtering medium 30 and of the second filtering medium 31. The primary frame strips 300 and the secondary frame strips 310 make it possible to give the air filter 3 its final dimensions. In one non-limiting embodiment, the primary frame strips 300 and the secondary frame strips 310 are made from polypropylene or fabric such as baize. The first filtering medium 30 and the second filtering medium 31 framed in this way result in the air filter 3 as illustrated in FIG. 11, with a length L1 larger than the length Lg/Lg' of the first filtering medium 30 and the second filtering medium 31, and a width L2 defined by the sum of the width La of the first filtering medium 30 and the width La' of the second filtering medium 31.

In non-limiting embodiments, the filtering layers C are non-woven layers, and/or comprise granules and/or fibers and/or active carbon. "Non-woven" is given to mean that the filtering layer C comprises fibers oriented directionally or randomly, connected by friction and/or cohesion and/or adhesion, to the exclusion of paper and products obtained by weaving, knitting, tufting or stitching incorporating binding threads or filaments or felted by water milling, needled or otherwise. They can be natural or chemical fibers. They can be discontinuous fibers or continuous filaments, or be formed in situ. "Fibers" is given to mean that the filtering layer C includes fibers held together in a predetermined order.

At least one primary frame strip 300 of the first filtering medium 30 is deformable. The deformable strip is the one that will interact with said at least one retaining device 100 (illustrated in FIGS. 5 to 9) of the housing 1 described below, when the first filtering medium 30 is fitted in the housing 1. The deformable primary frame strip 300 is configured to deform under pressure when the first filtering medium 30 is pushed by the operator by vertical translation. The deformable primary frame strip 300 deforms when it comes into contact with the retaining device 100 and passes to the other side of the retaining device 100 so that it can come into contact along its entire length with an inner face of a side 1a (illustrated in FIG. 5) of the housing 1. More particularly, the edge 300b (illustrated in FIGS. 6 to 9) of the deformable primary frame strip 300 is configured to fold in order to move past the retaining device 100 and pass to the other side, and then unfold once it has passed to the other side. When it is in contact with the side 1a of the housing 1, the deformable primary frame strip 300 is retained by the retaining device 100, particularly by its edge 300b. Unless a pulling force is exerted to remove the first filtering medium 30 from the housing 1, it cannot undergo a reverse vertical translation. It remains fitted in the housing 1 and an operator no longer needs to retain it manually before fitting the second filtering medium 31 into the housing 1. Vertical translation is given to mean a translation in the direction of the width of the housing 1. It will be noted that horizontal translation is given to mean a translation in the direction of the length of the housing 1.

Figure 3:
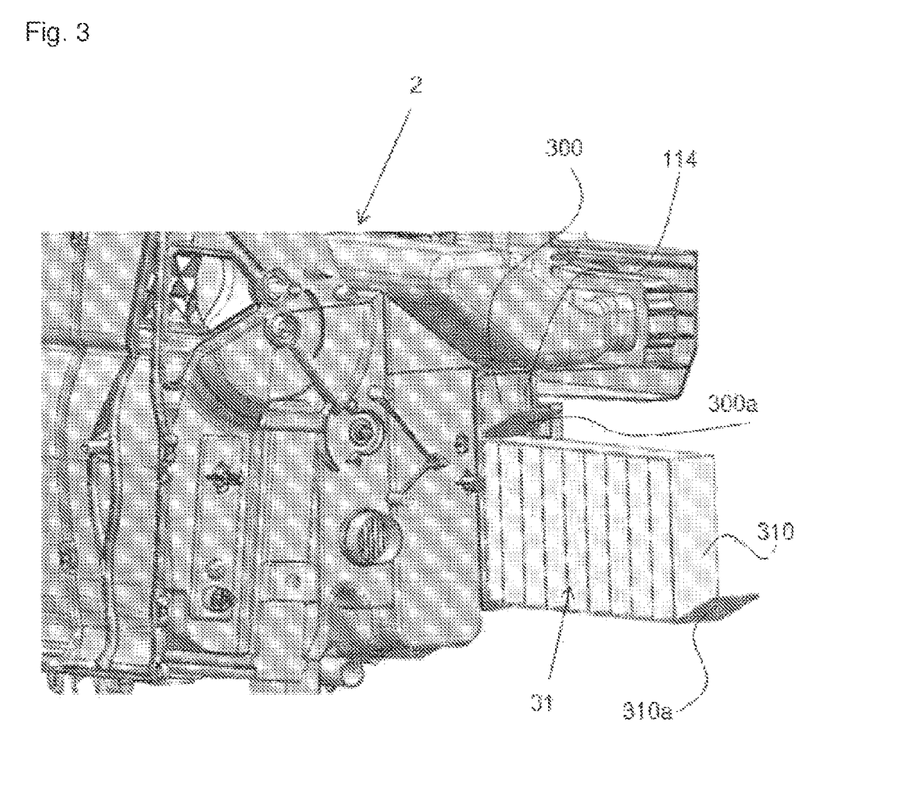
FIG. 3 illustrates a view of the second filtering medium of said air filter in FIG. 1, partially inserted into the housing in FIG. 1, according to a non-limiting embodiment.

As illustrated in FIG. 3, in one non-limiting embodiment, one primary frame strip 300 comprises a folding tab 300a, and one secondary frame strip 310 comprises a folding tab 310a. These are the frame strips facing the closing cover 113 (described below) of the housing 1. For the first filtering medium 30, the primary frame strip 300 that comprises the folding tab 300a is thus the strip adjacent to the deformable primary frame strip 300. The folding tabs 300a and 310a allow an operator to easily remove the first filtering medium 30 and the second filtering medium 31 respectively from the housing 1. L'opérateur va en effet pouvoir agripper les languettes rabattables 300a et 310a, et tirer dessus pour retirer le media filtrant primaire 30 et le second média filtrant 31 l'un aprés l'autre, en commençant par le second média filtrant 31. In another non-limiting embodiment (not illustrated), provision can be made for just one of the two primary 300 or secondary 310 frame strips to comprise a folding tab 300a or 310a.

Figure 1:
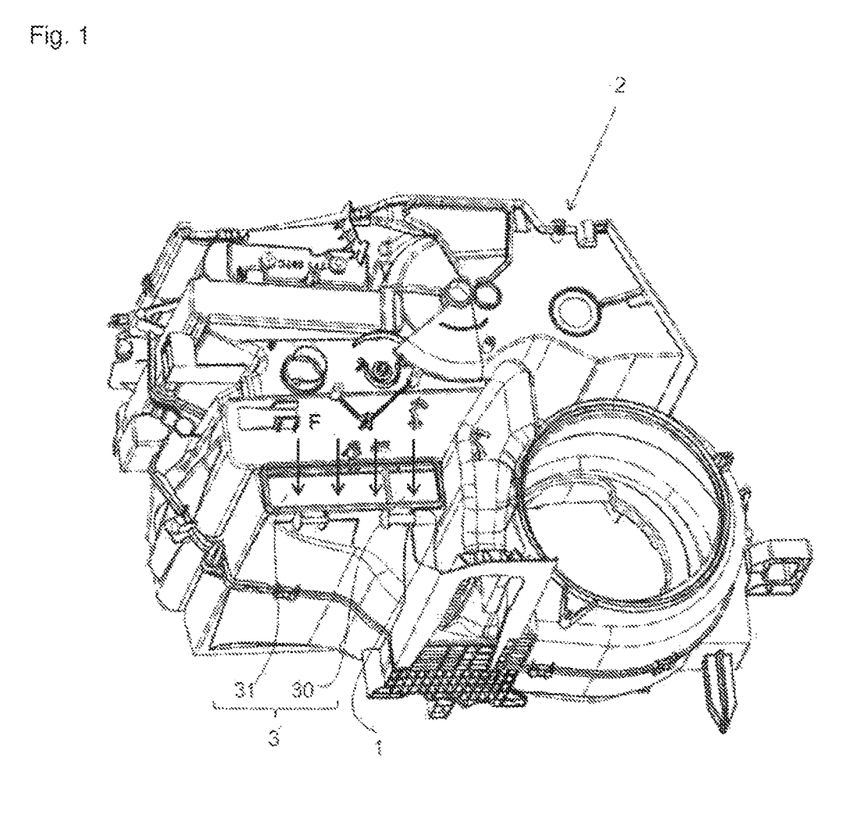
FIG. 1 illustrates a perspective view of a housing for a heating, air-conditioning and/or ventilation device for a motor vehicle, said housing being configured to receive an air filter, said air filter comprising a first filtering medium and a second filtering medium, according to a non-limiting embodiment of the invention.

As illustrated in FIGS. 1 and 2, the housing 1 is configured to receive the first filtering medium 30 and the second filtering medium 31. In an illustrated non-limiting embodiment, the housing 1 forms part of the HVAC device. The housing 1 is thus a recess made directly in the HVAC device, in one non-limiting example, the housing 1 is the distribution box of the HVAC device. In another non-limiting embodiment (not illustrated), the housing 1 is attached. It is independent of the HVAC device. The housing 1 is thus removable and can be inserted into a recess in the HVAC device provided to this end. In one non-limiting example, the housing 1 can be fastened to the HVAC device by screwing.

Figure 5:
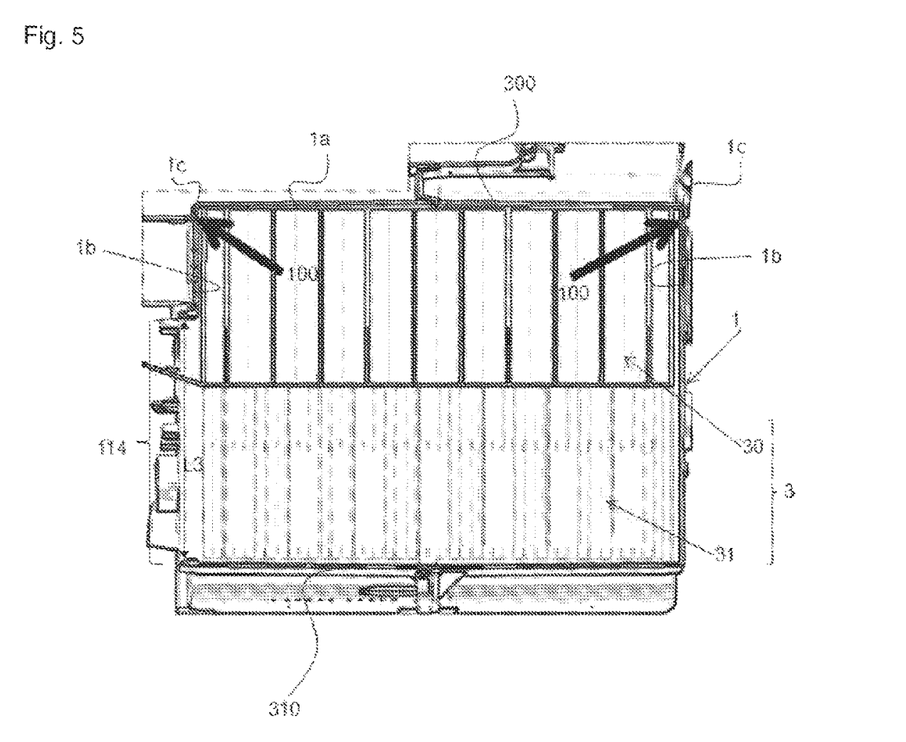
FIG. 5 illustrates a cross-sectional view of said housing and said air filter in FIG. 1, according to a non-limiting embodiment.
Figure 6:
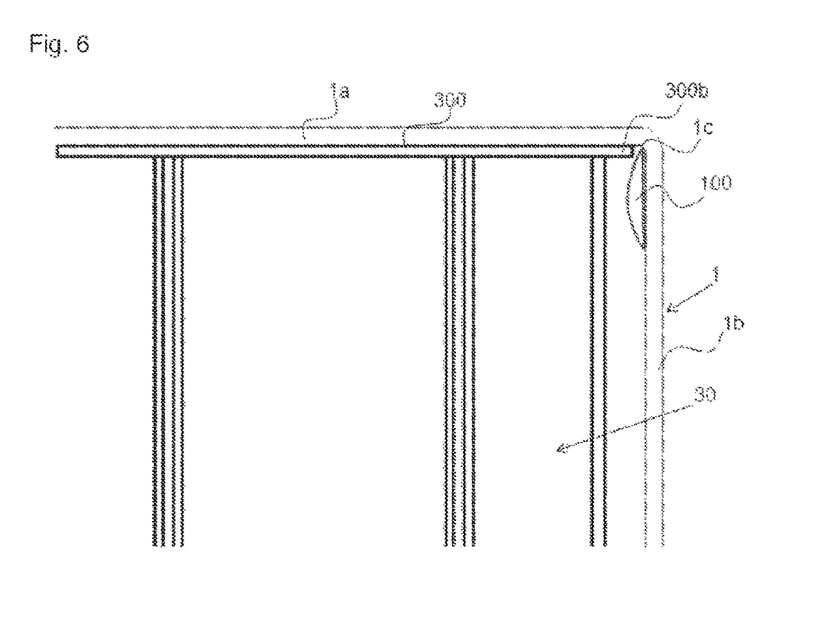
FIG. 6 illustrates a close-up view of part of the cross-sectional view in FIG. 5, said housing comprising a retaining device that is a stop, according to a first variant of a first non-limiting embodiment.

As illustrated in FIGS. 3 and 5, the housing 1 comprises an opening 114 through which the first filtering medium 30 and said second filtering medium 31 can be inserted. As illustrated in FIG. 5, the opening 114 has a width L3 larger than the width La or the with La' described above, but smaller than the sum of the two widths La and La'. The operator can thus insert a filtering medium into the housing 1. In addition, this makes it possible to prevent the horizontal translation of the first filtering medium 30 when it is fitted in the housing 1.

Figure 4:
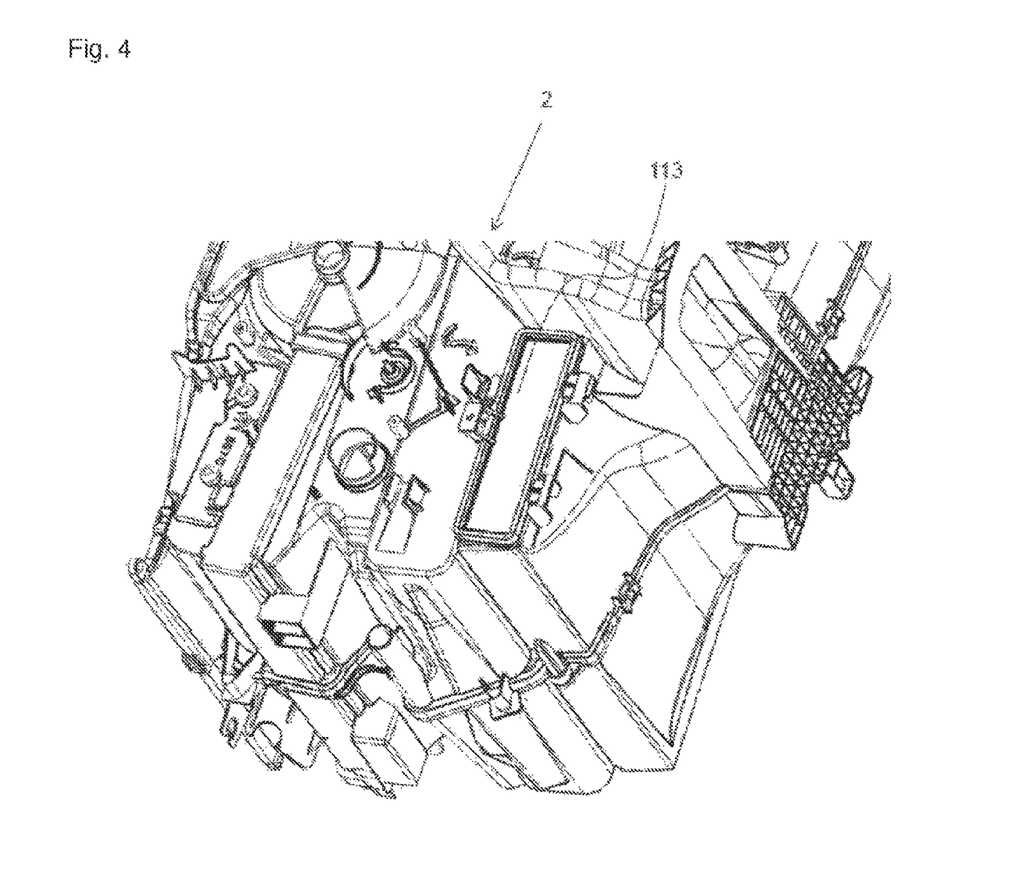
FIG. 4 illustrates said housing in FIG. 1 comprising a closing cover for protecting said air filter, according to a non-limiting embodiment.

As illustrated in FIG. 4, the housing 1 further comprises a closing cover 113 configured to close off the housing 1 and protect the primary filtering medium 30 and the second filtering medium 31 from the ingress of dust or fluids. The closing cover 113 is configured to cover the opening 114.

The housing 1 further comprises at least one retaining device 100 configured to retain the deformable primary frame strip 300 when said first filtering medium 30 is fitted in said housing 1. As illustrated in FIG. 5, said at least one retaining device 100 is arranged on an inner face of a side 1b of the housing 1 and near a corner 1c of the housing 1. The side 1b is adjacent to the side 1a with which the first filtering medium 30 is in contact along its length when it is fitted in the housing 1. As illustrated in FIG. 5, in one non-limiting embodiment, the housing 1 comprises two retaining devices 100. They are each arranged on opposite sides 1b to each other.

According to a first non-limiting embodiment, said at least one retaining device 100 is a stop. According to a first non-limiting variant illustrated in FIG. 6, the stop 100 has a hemispherical cross-section. When the first filtering medium 30 is pushed in vertical translation into the housing 1 through pressure exerted by the operator, the edge 300b of the deformable primary frame strip 300 folds and slides easily over the rounded surface of the stop 100. Once it has moved past the stop, the edge 300b unfolds and will be accommodated in the corner 1c of the housing 1. It is retained by the stop 100. The first filtering medium 30 is pushed until it is in contact with the side 1a of the housing 1 and the deformable primary frame strip 300 is held in contact along its entire length with the side 1a of the housing 1. The first filtering medium 30 is thus held in position and fitted in the housing 1. It can only be removed from the housing 1 if the operator exerts a pulling force in vertical translation. It will be noted that when the housing 1 comprises two stops 100 with a hemispherical cross-section, the same principle applies to the other edge 300b of the deformable primary frame strip 300 that interacts with the other stop 100.

Figure 7:
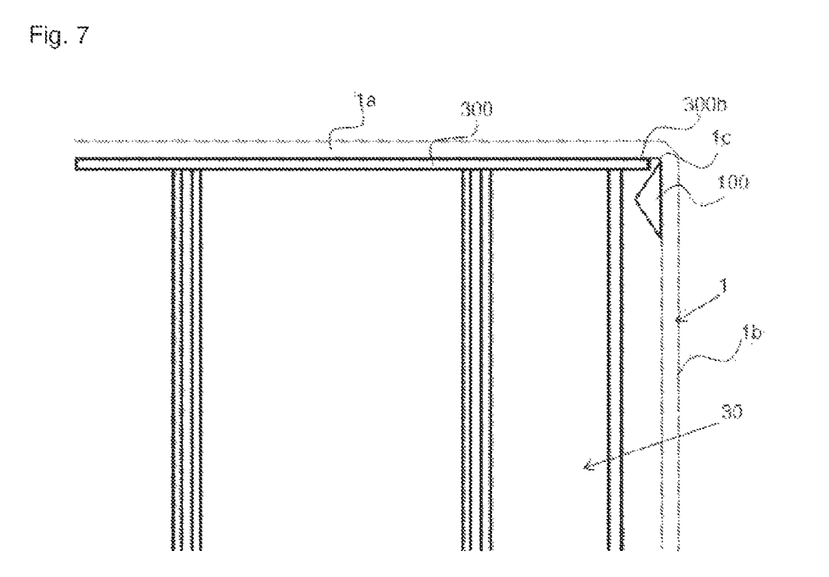
FIG. 7 illustrates a close-up view of part of the cross-sectional view in FIG. 5, said housing comprising a retaining device that is a stop, according to a second variant of a first non-limiting embodiment.
Figure 8:
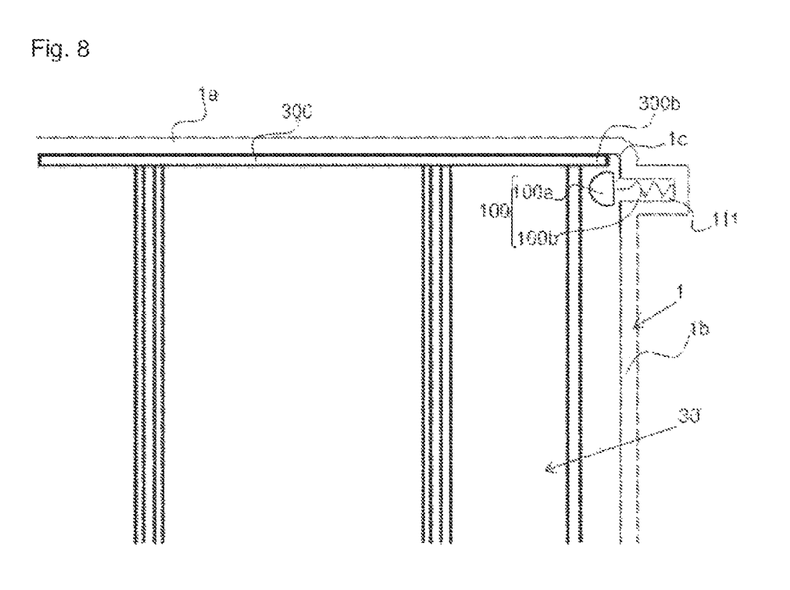
FIG. 8 illustrates a close-up view of part of the cross-sectional view in FIG. 5, said housing comprising a retaining device that comprises a head connected to a spring, according to a first variant of a second non-limiting embodiment.

According to a second non-limiting variant illustrated in FIG. 7, the stop 100 has a triangular cross-section. When the first filtering medium 30 is pushed in vertical translation into the housing 1 through pressure exerted by the operator, the edge 300b of the deformable primary frame strip 300 folds and slide over the slope of the stop 100. Once it has moved past the stop 100, the edge 300b unfolds and will be accommodated in the corner 1c of the housing 1. It is retained by the stop 100. The first filtering medium 30 is pushed until it is in contact with the side 1a of the housing 1 and the deformable primary frame strip 300 is held in contact along its entire length with the side 1a of the housing 1. The first filtering medium 30 is thus held in position and fitted in the housing 1. It can only be removed from the housing 1 if the operator exerts a pulling force in vertical translation. It will be noted that when the housing 1 comprises two stops 100 with a triangular cross-section, the same principle applies to the other edge 300b of the deformable primary frame strip 300 that interacts with the other stop 100.

According to a second non-limiting embodiment, the retaining device 100 comprises a head 100a extended by a spring 100b. According to a first non-limiting variant illustrated in FIG. 8, the housing comprises a cavity 111 configured to receive said spring 100b. According to one non-limiting embodiment, the head 100a has a hemispherical cross-section. When the first filtering medium 30 is pushed in vertical translation by the operator towards the side 1a of the housing 1, the deformable primary frame strip 300 deforms on contact with the head 100a. More particularly, the edge 300b of the deformable primary frame strip 300 folds, slides over the rounded surface of the head 100a and at the same time pushes said head 100a. The spring 100b retracts and the edge 300b can move past the head 100a and pass to the other side. The spring 100b then extends and the head 100a returns to its initial position. The edge 300b unfolds and will be accommodated in the corner 1c of the housing 1. It is retained by the retaining device 100, in particular the head 100a. The first filtering medium 30 is pushed until it is in contact with the side 1a of the housing 1 and the deformable primary frame strip 300 is held in contact along its entire length with the side 1a of the housing 1. The first filtering medium 30 is thus held in position and fitted in the housing 1. It can only be removed from the housing 1 if the operator exerts a pulling force in vertical translation. It will be noted that when the housing 1 comprises two retaining devices 100, it comprises two cavities 111 and the same principle applies to the other edge 300b of the deformable primary frame strip 300 that interacts with the other retaining device 100, it will be noted that in this first non-limiting variant, a single retaining device 100 is sufficient.

Figure 9:
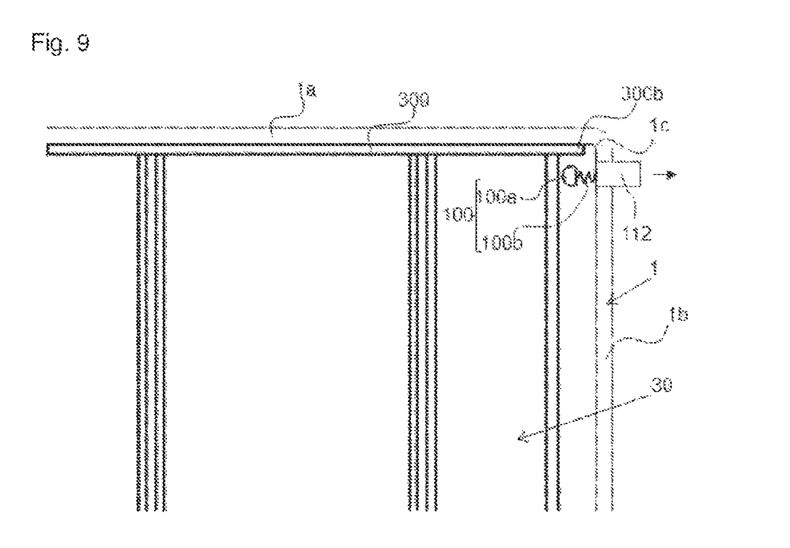
FIG. 9 illustrates a close-up view of part of the cross-sectional view in FIG. 5, said housing comprising a retaining device that comprises a head connected to a spring, according to a second variant of a second non-limiting embodiment.

According to a second non-limiting variant illustrated in FIG. 9, the housing comprises a movable external tab 112 connected to said spring 100b. According to one non-limiting embodiment, the head 100a has a hemispherical cross-section. The movable external tab 112 allows the operator to pull the retaining device 100 in horizontal translation (illustrated by the arrow) while pushing the first filtering medium 30 towards the side 1a in vertical translation. Pulling the retaining device 100 in horizontal translation makes it possible to let the edge 300b of the deformable primary frame strip 300 pass to the other side of the retaining device 100, in particular to the other side of the head 100a. When the first filtering medium 30 is pushed in vertical translation by the operator towards the side 1a of the housing 1, the deformable primary frame strip 300 deforms on contact with the head 100a. More particularly, the edge 300b of the deformable primary frame strip 300 folds, slides over the rounded surface of the head 100a and at the same time pushes said head 100a. The spring 100b retracts and the edge 300b can move past the head 100a and pass to the other side. The operator can then release the movable external tab 112 and the spring 100b extends and the head 100a returns to its initial position. The edge 300b unfolds and will be accommodated in the corner 1c of the housing 1. It is retained by the retaining device 100. The first filtering medium 30 is pushed until it is in contact with the side 1a of the housing 1 and the deformable primary frame strip 300 is held in contact along its entire length with the side 1a of the housing 1. The first filtering medium 30 is thus held in position and fitted in the housing 1. It can only be removed from the housing 1 if the operator exerts a pulling force in vertical translation and pulls on the movable external tab 112 again. It will be noted that in this second non-limiting variant, a single retaining device 100 is sufficient.

In order to replace the air filter 3 in the motor vehicle as an after-sales fit, otherwise known as replacement fit, the operator removes the second filtering medium 31 and then the first filtering medium 30 through the opening 114 provided to this end. When new filtering mediums are refitted, the first filtering medium 30 is first inserted through the opening 114, then translated vertically to its final position. Said at least one retaining device 100 added to the housing 1 ensures that it is retained via the deformable primary frame strip 300 and held in its upper position. This facilitates the installation of the first filtering medium 30. The second filtering medium 31 is then inserted through the opening 114, then translated vertically until it is in contact along its entire length with the first filtering medium 30. It will be noted that to remove the second filtering medium 31, it is sufficient to pull gently thereon, if applicable using the folding tab 310a. To remove the first filtering medium 30, it is sufficient to pull gently thereon in order to free it from said at least one retaining device 100, if applicable using the folding tab 300a.

Of course, the description of the invention is not limited to the embodiments described above and to the field described above. In the field of motor vehicles, in non-limiting embodiments, the housing 1 can thus be used to receive an air filter of a motor vehicle engine. The housing 1 described can thus be used in fields other than that of motor vehicles, such as in non-limiting examples, the fields of:
   a. construction. In this case, in a non-limiting example, the housing 1 is used to receive an air-conditioning air filter for a building or an air filter for individuals in construction for filtering dust,
   b. IT protection. In this case, in a non-limiting example, the housing 1 is used to receive an air filter of a computer,
   c. health and safety. In this case, in a non-limiting example, the housing 1 is used to receive an air filter for individuals for filtering dust,
   d. domestic appliances. In this case, in a non-limiting example, the housing 1 is used to receive an air filter for a vacuum cleaner.

Thus, the invention described has the following advantages in particular:
   a. it makes it possible to hold the first filtering medium 30 in place in the housing 1 when the second filtering medium 31 is not installed, without making it more difficult to remove; this thus makes it easier for an operator to fit the air filter 3 as a whole; the operator no longer needs to manually retain the first filtering medium 30 when they are installing the second filtering medium 31 in the housing 1,
   b. it is simple to implement.

The invention claimed is:

1. A housing for a heating, air-conditioning and/or ventilation device of a motor vehicle, the housing is configured to receive an air filter which comprises:
   a first filtering medium delimited by four primary frame strips, and
   a second filtering medium delimited by four secondary frame strips,
   wherein the housing comprises:
      at least one retaining device arranged on a first inner face of a side of the housing and near a corner of the housing,
      wherein the at least one retaining device is configured to retain one of the primary frame strips while the first filtering medium is fitted in the housing,
      wherein at least one of the primary frame strips is in contact along its entire length with a second inner face of a side of the housing when the first filtering medium is fitted in the housing.

2. The housing as claimed in claim 1, wherein the housing comprises two retaining devices.

3. The housing as claimed in claim 1, wherein the at least one retaining device is a stop.

4. The housing as claimed in claim 2, wherein the stop has a cross-section that is hemispherical or triangular.

5. The housing as claimed in claim 1, wherein the at least one retaining device comprises a head extended by a spring.

6. The housing as claimed in claim 5, further comprising a cavity configured to receive said spring.

7. The housing as claimed in claim 1, wherein one of the primary frame strips and/or one of the secondary frame strips comprises a folding tab.

8. An air filter configured to be received in a housing for a heating, air-conditioning and/or ventilation device for a motor vehicle, the air filter comprising:
   a first filtering medium delimited by four primary frame strips; and
   a second filtering medium delimited by four secondary frame strips,
   wherein the housing comprises:
      at least one retaining device arranged on a first inner face of a side of the housing and near a corner of the housing,
   wherein one of the primary frame strips is deformable and is configured to be retained by the at least one retaining device of the housing,
   wherein at least one of the primary frame strips is in contact along its entire length with a second inner face of a side of the housing when the first filtering medium is fitted in the housing.

9. A heating, air-conditioning and/or ventilation device of a motor vehicle comprising a housing configured to receive the air filter as claimed in claim 8.

10. The housing as claimed in claim 5, further comprising a movable external tab connected to the spring.

11. The housing as claimed in claim 1,
   wherein at least one primary frame strip comprises at least one edge,
   wherein the at least one edge accommodates in the corner of the housing when the first filtering medium is fitted in the housing.

12. The housing as claimed in claim 11, wherein the at least one retaining device is configured to retain the at least one edge when the first filtering medium is fitted in the housing.

* * * * *